UNITED STATES PATENT OFFICE.

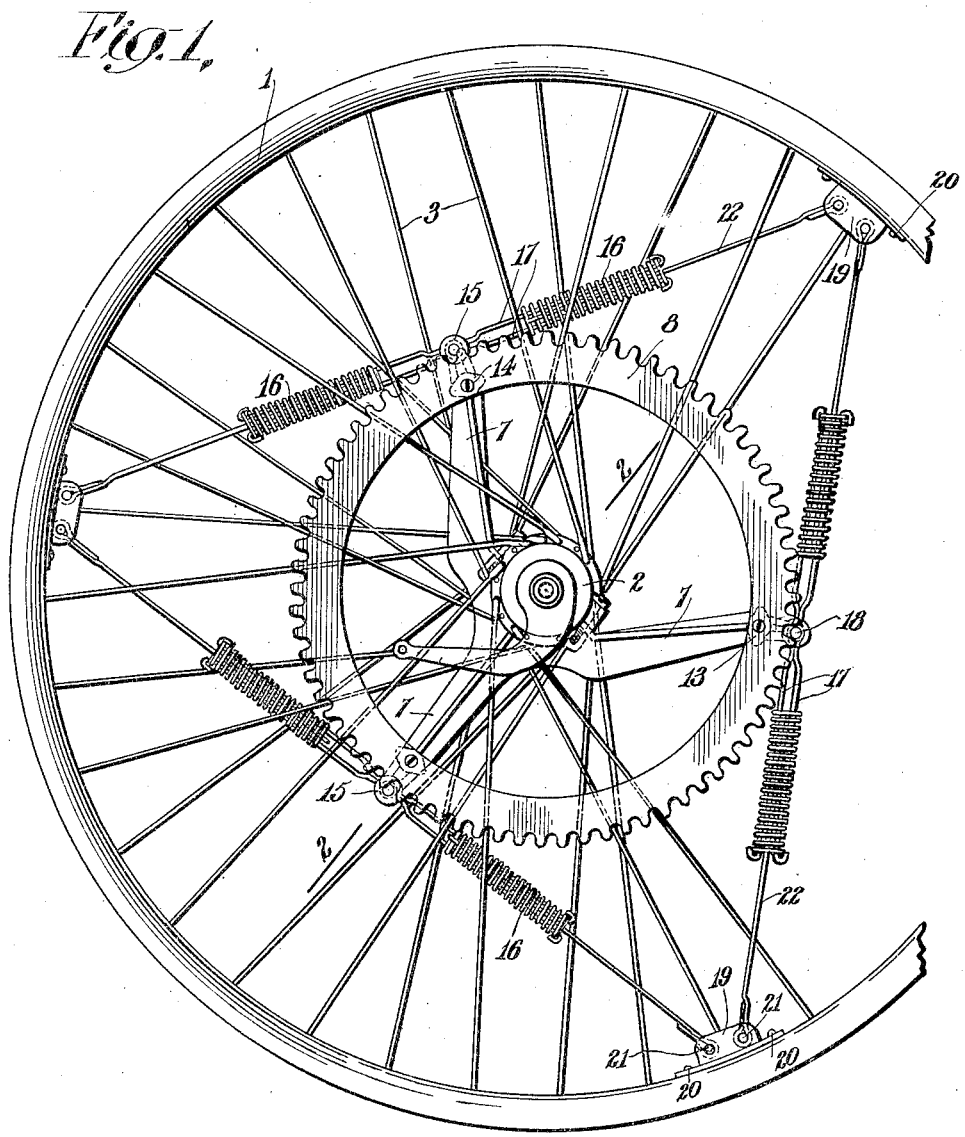

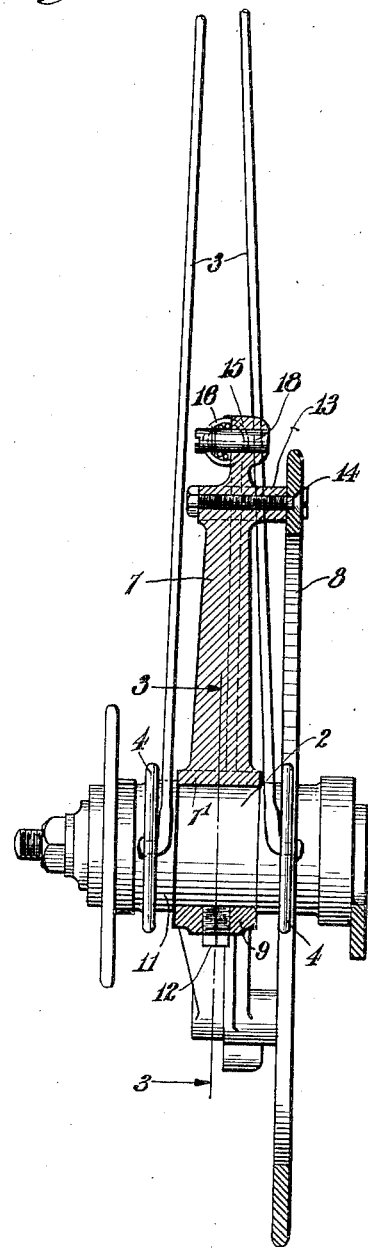

LOUIS JAMES JOHNSON, OF SOUTH BEND, INDIANA.

TRACTION-WHEEL.

1,341,466.  Specification of Letters Patent.  Patented May 25, 1920.

Application filed April 30, 1919. Serial No. 293,859.

*To all whom it may concern:*

Be it known that I, LOUIS J. JOHNSON, a citizen of the United States, residing at South Bend, in the county of St. Joseph and State of Indiana, have invented certain new and useful Improvements in Traction-Wheels, of which the following is a specification.

My invention relates to motor driven wheels which are especially adaptable for use as traction wheels in vehicles of light weight, such as motorcycles, motor driven bicycles, motor driven buckboards, railway motor cars and the like. The purpose of my invention is to provide a simple and efficient construction in which the irregular or variable forces exerted by the internal combustion engine are absorbed and the traction wheel driven in an even and regular manner. The irregular flow of power from the internal combustion engine, especially in the case of engines having few cylinders and light weight, is the cause of much strain on any transmission or device to which the power is applied, as well as on the engine itself. Such strains are greatly relieved by my improved construction, because of which various advantages are secured.

In my improved construction a transmission member such as a sprocket wheel, or a gear or a pulley, is mounted upon a rotatable hub for a limited rotation relative thereto, the rim of the traction wheel being rigidly secured to the hub, as by the usual spoke construction. The sprocket or other transmission wheel rim is rigidly secured to the arms of a spider which has a central sleeve or housing portion, preferably formed in two parts, this housing being the member which is mounted on the hub for limited rotation relative thereto as stated. The limited relative rotation is provided for by extending spring connections from points on the traction wheel rim to points on the sprocket rim (or to points on the spider arms), so that the shock transmitted to the sprocket because of the irregular operation of the motor will be absorbed in the spring connections. The object of my invention is to provide improved constructions of the character referred to.

In order that a clearer understanding of my invention may be had, attention is hereby directed to the accompanying drawings forming part of this application and illustrating a preferred embodiment of my invention. In the drawings Figure 1 represents a side elevation of a wheel for a motor driven bicycle, constituting and provided with my invention; Fig. 2 is a section taken on line 2—2 of Fig. 1, with the construction considered as rotated through 180 degrees; Fig. 3 is a section taken on line 3—3 of Fig. 2; and Fig. 4 is a bottom plan view of the construction illustrated in Fig. 3.

Referring to the drawings the invention is shown as applied to a traction wheel intended to replace the rear wheel of an ordinary bicycle in order to adapt the same for motor operation, although it is obvious that my invention is not limited to such use. In the form of invention illustrated, the traction wheel rim 1 is rigidly mounted on the coaster brake hub 2 by means of the spokes 3 which are secured to the spoke flanges 4, 4, on the hub 2. The latter is rotatably mounted on the axle 5. The spokes 3 are preferably larger and stronger than the ordinary bicycle spoke. In order to increase the clearance between the tire of the traction wheel and the frame of the bicycle, so that the travel of the drive chain may be facilitated, the center of the rim 1 is preferably set over one-eighth of an inch from the center line of the coaster brake hub 2.

The spider 6 is mounted for limited rotation on the coaster brake hub between the two sets of spokes 3, 3. This spider is provided with a plurality, preferably three, of arms 7, 7, 7, to which the transmission wheel rim, such as the sprocket rim 8, is rigidly secured. The spider 6 is provided with a two-part bearing on the coaster brake hub 2, so that the same may readily be installed, and also to provide adjustment for wear. In my preferred construction the spider proper has one bearing portion only, indicated at 7', which bears on one half the circumference of the hub 2, the bearing being completed by a cap 9. Preferably the arms 7 extend outwardly from and are integral with the bearing portion 7' only. The cap 9 is secured to the bearing portion 7' of the spider in any suitable manner as by means of the screws 10, 10, the bearing portion 7' and the cap 9 together forming a complete housing about the coaster brake hub, the latter being formed with shoulders 11 between which the spider and cap are mounted, so that motion of the spider is restricted to one of rotation about the hub.

It is advantageous to have the three arms 7 of the spider integral with one only of the two parts of the housing, so that the cap 9 may be removed for inspection of the bearing or for any other reason without disturbing any other part. Also reduction of any lost motion in the bore of the spider may be attended to by removing shims or filing the surface of the cap 9, or the like, without altering the distance from the center of the axle to the points of attachment of the sprocket rim 8 to the arms 7. It will be evident that the manufacture, repair and adjustment of the parts are facilitated by making all of the arms 7 integral or connected with one only of the two parts of the housing construction. The cap 9 may be provided with an opening therethrough which is illustrated as closed by the plug 12, this opening being intended to aline with the oil hole in the coaster brake hub.

The arms 7 of the spider are provided with bosses 13 which extend laterally between the spokes 3 on one side of the wheel, these bosses being provided with flat vertical surfaces against which the sprocket rim 8 is placed and secured rigidly in position by fastening devices such as the screws 14. By this arrangement the sprocket rim is positioned concentrically with the hub 2 and axle 5 and in proper position to permit unobstructed travel of the chain which is intended to run over the teeth of the sprocket rim 8. The bosses 13 are of limited thickness in order not to prevent the desired amount of rotation of the spider about the hub 2, while at the same time a sufficient amount of flat vertical surface should be provided at the ends of the bosses to hold the sprocket rim 8 in a true plane.

In the construction described the three spider arms extend beyond the bosses 13 a slight distance, terminating in bosses 15 to which the spring connections are secured. These springs are provided in pairs which extend in opposite directions from the bosses 15 to points on the traction wheel rim 1, in order to provide for taking up shocks in either direction which may be imparted from the internal combustion engine of a motorcycle or the like to the sprocket rim 8. Preferably I employ springs of the draw bar type for this purpose. In the construction illustrated spiral springs 16, 16, are employed from each of which extends a pair of metal rods or wires 17, 17, the ends of which are secured to pins 18 which are mounted in bosses 15. These ends 17 of the spring constructions are held in place on pins 18 by suitable means, such as washers and cotter pins, so as to permit a very limited rotation of the spring members about pins 18.

The traction wheel rim 1 is provided with brackets 19, three of these being illustrated in the drawings as equally spaced about the rim 1. These brackets may be secured to the rim in any suitable manner, as by means of bolts or rivets 20, 20. Each bracket is provided with a pair of studs 21, 21, over which the outer ends of the spring constructions are secured. In the form of construction illustrated each of the spiral springs is provided with an outwardly extending axial metal member 22, the outer ends of these members being secured about studs 21 as stated. By the construction described the ends of the springs are held approximately in the center line of the traction wheel. With the draw bar type of spring described a further movement than the full extension of the coil part of the spring may be had without injury. A considerable movement of the springs is necessary in order to absorb all of the force imparted to the sprocket during the high pressure portion of the stroke of the internal combustion engine. It will be noted that with the construction illustrated each pair of springs forms a substantially straight line from one bracket 19 to the opposed bracket 19 with the connection with an arm 7 at the intermediate point between the two brackets, a balanced equilateral triangular spring construction being thus provided.

It will be clear from the above that the power from an internal combustion engine is transmitted through a chain or other form of transmission to the sprocket or other transmission member 8 as a jerky uneven force which is absorbed by the springs 16 and in turn transmitted to the rim 1 as a smooth even flow of force. This force received by the rim is practically uniform. When the improved construction described is used as part of the motor driven bicycle, the motor may be installed above the wheel in the manner, for example, which is described in my Patent No. 1,257,711, February 26, 1918, with a sprocket chain from the motor running over the sprocket rim 8 of the wheel.

When the shock-absorbing traction wheel described is applied to a motor driven bicycle, it will be noted that the elimination of the shock of the motor makes possible the driving of an ordinary light bicycle by a rigid transmission such as a chain, whereas a chain without a shock absorber can not be used successfully to drive a bicycle. Further, the absence of shock from the motor lends much comfort to the passenger, and the frame work and rear wheel of the bicycle, usually of light construction, are not subjected to severe strains. It may also be noted that the ordinary bicycle cement section tire may be used without any more danger of the same slipping on the rim than is experienced with a foot power bicycle. Also the use of my improved device greatly reduces the wear on the chain and sprockets and also prevents the chain from running off the sprockets. Likewise the bicycle may be driven at slower speeds without a noticeably jerky movement, as is the case when a rigid sprocket is used, and furthermore there will be no excessive force at certain points in the revolution of the wheel which would tend to slip the tire on the ground and wear it in spots, as is the case when a rigid sprocket is used.

It will be noted that my invention is not strictly limited to the exact details of construction described, but is as broad as is indicated by the accompanying claims.

What I claim is:—

1. In a traction wheel, the combination of a rotatable hub, a traction wheel rim, spokes securing said rim to said hub, a spider rotatably mounted on said hub, and having outwardly-extending arms, an annular transmission member secured to said spider arms, and spring connections extending in opposite directions from said arms to points of attachment with said rim.

2. In a traction wheel, the combination of a rotatable hub, a traction wheel rim, spokes securing said rim to said hub, a spider comprising a two-part housing rotatably mounted on said hub, one only of said parts having outwardly-extending arms, an annular transmission member secured to said arms, and spring connections between said transmission member and rim.

3. In a traction wheel, the combination of a rotatable hub having spoke flanges, a traction wheel rim, spokes securing said rim to said flanges, a spider rotatably mounted on said hub, between said flanges, and having outwardly-extending arms, a transmission member concentric with said hub, outside the spokes on one side, said spider arms having projections extending between spokes on said side, means for securing said transmission member rigidly to said projections, and spring connections between said transmission member and rim.

4. In a traction wheel, the combination of a rotatable hub having flanges thereon, a traction wheel rim, spokes securing said rim to said hub, a spider rotatably mounted on said hub between said flanges and having outwardly-extending arms, having laterally-extending bosses, a transmission wheel rim concentric with said hub, rigidly secured to said bosses, and spring connections between said transmission wheel rim and said traction wheel rim.

5. In a traction wheel, the combination of a rotatable hub, a traction wheel rim, spokes securing said rim to said hub, a spider rotatably mounted on said hub, and having outwardly-extending arms with laterally-extending bosses adjacent their ends, and with other bosses at their ends, a transmission wheel rim concentric with said hub, rigidly secured to said first bosses, and connections including spiral springs arranged in pairs, each pair of connections being secured at one end to one of said second bosses, and extending in opposite directions to points of attachment with said traction wheel rim.

6. In a traction wheel, the combination of a rotatable hub, a traction wheel rim having three equally spaced brackets thereon, spokes securing said rim to said hub, a spider rotatably mounted on said hub and having three outwardly-extending arms having laterally-extending bosses adjacent their ends, a transmission wheel rim rigidly seccured to said bosses, at one side of said spokes, and connections including spiral springs extending from the outer ends of said arms to said brackets, the outer end of each arm being midway between a pair of brackets.

This specification signed and witnessed this 5th day of March, 1919.

LOUIS JAMES JOHNSON.

Witnesses:
ELMER EUGENE DARCEY,
BERT. F. FULLER.